United States Patent
Klein et al.

(10) Patent No.: US 12,122,444 B2
(45) Date of Patent: Oct. 22, 2024

(54) ADJUSTMENT DEVICE FOR A STEERING WHEEL OF A MOTOR VEHICLE

(71) Applicants: Witte Automotive GmbH, Velbert (DE); Ford Global Technologies LLC, Dearborn, MI (US)

(72) Inventors: Heinz-Joachim Klein, Haan (DE); Markus Schaps, Herne (DE); Thorsten Janssen, Velbert (DE); Martin Fassbender, Buschhoven (DE); Thomas Kreuz, Mechernich (DE); Philipp Küpper, Grevenbroich (DE)

(73) Assignees: Witte Automotive GmbH, Velbert (DE); Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 18/318,818

(22) Filed: May 17, 2023

(65) Prior Publication Data

US 2023/0373552 A1 Nov. 23, 2023

(30) Foreign Application Priority Data

May 20, 2022 (DE) ...................... 10 2022 205 078.9

(51) Int. Cl.
*B62D 1/04* (2006.01)
*B62D 1/06* (2006.01)
*B62D 1/10* (2006.01)

(52) U.S. Cl.
CPC ................. *B62D 1/10* (2013.01); *B62D 1/06* (2013.01)

(58) Field of Classification Search
CPC ... B62D 1/06; B62D 1/08; B62D 1/10; B62D 1/105; B62D 1/183
See application file for complete search history.

(56) References Cited

U.S. PATENT DOCUMENTS 10,710,627 B2 * 7/2020 Kreutz ..................... B62D 1/10
11,180,177 B1 11/2021 Aktas et al.
(Continued)

FOREIGN PATENT DOCUMENTS

DE 102019134898 A1 * 6/2021 .............. B62D 1/04
DE 102021123507 A1 3/2022
(Continued)

OTHER PUBLICATIONS

European Patent Office, Search Report in Application No. EP23173824.6 dated Oct. 16, 2023, 9 pages, Munich, Germany.
(Continued)

*Primary Examiner* — Adam D Rogers
(74) *Attorney, Agent, or Firm* — Marshall & Melhorn, LLC

(57) ABSTRACT

An adjustment device for a steering wheel may have a first shaft about which the steering wheel is pivotable. A rotary latch is rotationally fixed to the steering wheel by a rotary latch element. A second shaft is arranged in parallel with the first shaft. A coupling lever is arranged on the second shaft to interact with the rotary latch element. The coupling lever has a stop surface which, for the purpose of engagement, engages in at least one corresponding stop surface of the rotary latch element when the steering wheel, and thus also the rotary latch, is pivoted. At least one of the stop surfaces may have a chamfer via which the coupling lever can be displaced or is displaced out of the engagement with the rotary latch element when a predetermined force is applied to the steering wheel.

10 Claims, 14 Drawing Sheets

(56) References Cited

U.S. PATENT DOCUMENTS

| | | | |
|---|---|---|---|
| 11,919,561 B2 * | 3/2024 | Leboeuf | ................... B62D 1/10 |
| 2020/0101998 A1 | 4/2020 | Nishimura et al. | |
| 2021/0229732 A1 | 7/2021 | Kastelic et al. | |

FOREIGN PATENT DOCUMENTS

| | | |
|---|---|---|
| FR | 3108884 A1 | 10/2021 |
| WO | 2021205039 A1 | 10/2021 |

OTHER PUBLICATIONS

German Patent Office, Office Action in Application No. DE102022205078.9 dated Jan. 9, 2023, 8 pages, Munich, Germany.

\* cited by examiner

ADJUSTMENT DEVICE FOR A STEERING WHEEL OF A MOTOR VEHICLE

FIELD

The invention relates to an adjustment device for a steering wheel of a motor vehicle.

BACKGROUND

In the prior art, steering wheels are known which are pivotable out of a driving position into at least one further position.

U.S. Pat. No. 11,180,177 B1 describes a steering wheel assembly, comprising a rim which is movably connected to a base for movement between the driving and use positions. A movement control mechanism is configured to selectively lock the rim in the driving position, relative to the base structure. The movement control mechanism comprises a detent which is configured to hold the edge structure in the use position relative to the base structure, thereby enabling a user to apply a force to the edge structure to overcome the detent and to move the edge structure from the use position to the driving position.

DE 10 2021 123 507 A1 describes a steering wheel for a transportation means, comprising a hub and a rim extending around the hub, the rim being mounted so as to be pivotable about a tilting axis between a steering position and at least one non-steering position. The steering wheel comprises two releasable locking arrangements which are arranged opposite one another in relation to the hub, each of the two locking arrangements having a hub locking device on the hub and a rim locking device on the rim for blocking the pivoting by mutual engagement. The hub locking device and the rim locking device are designed to engage with one another at a distance from the tilting axis.

SUMMARY

The object of the present invention is to specify a novel adjustment device for a pivotable steering wheel of a motor vehicle.

The object is achieved according to the invention by an adjustment device for a steering wheel of a motor vehicle according to the claims.

An adjustment device according to the invention for a steering wheel of a motor vehicle comprises a bearing block having a first shaft arranged therein which is oriented or can be oriented in parallel with a transverse axis of the vehicle and about which the steering wheel is pivotable between a driving position and at least one further position, a rotary latch being rotationally fixed to the steering wheel by a rotary latch element arranged in a working plane, and being pivotable together therewith about the first shaft, a second shaft being arranged in the bearing block in parallel with the first shaft, a coupling lever being arranged on the second shaft to interact with the rotary latch element, the coupling lever being arranged on the second shaft so as to be displaceable out of the working plane in opposition to the force of a spring, the coupling lever having a stop surface, which, for the purpose of engagement, engages in at least one corresponding stop surface of the rotary latch element and strikes thereon when the steering wheel, and thus also the rotary latch, is pivoted into the at least one further position, at least one of the stop surfaces comprising a chamfer, via which the coupling lever can be displaced or is displaced out of the engagement with the rotary latch element, from the further position in the direction of the driving position, counter to the force of the spring, when a predetermined force is applied to the steering wheel.

In this way, a mechanical overload release for the tilt-adjustable steering wheel is provided, in order to be able to move said steering wheel from the further position, for example a comfort position, in particular a first comfort position or a second comfort position, into the driving position. In further embodiments, more than two further positions, for example comfort positions, can also be provided.

In one possible development, the rotary latch further comprises a further rotary latch element arranged in a further working plane, a pawl being arranged pivotably on the second shaft to interact with the further rotary latch element, the pawl having a stop surface which, due to the force of a restoring spring, engages in a corresponding stop surface of the further rotary latch element and strikes thereon when the steering wheel and thus also the rotary latch is pivoted into the driving position. These stop surfaces in particular do not have a chamfer, by means of which a mechanical overload release would be possible. In this way, secure locking of the steering wheel in the driving position is possible.

In a further embodiment, an actuating mechanism, for example comprising a Bowden cable, can be arranged so as to pivot the coupling lever and/or the pawl about the second shaft, out of engagement with the rotary latch. The actuating mechanism can be configured for manual actuation and/or for operation by an electric drive.

In a development, the coupling lever can be preloaded toward the working plane by means of a spring. A spring constant of this spring, together with friction values of the contact surfaces in engagement and the chamfers thereof, as well as the lever lengths of the mechanical components involved, determines the force which must be applied to the steering wheel for the mechanical overload release. This means that the overload release is reproducible multiple times. By selecting the spring having the corresponding spring constant, the required force for the overload release is adjustable.

In a development, the coupling lever can be prevented from engaging rotationally, in the displaced position, by a guide element on the rotary latch.

In a further embodiment, a driver mechanism can be arranged, which, when the coupling lever is pivoted by a predetermined angle of rotation, also entrains the pawl and pivots it out of a possible engagement with the further rotary latch element. The driver mechanism can be designed such that an independent pivoting of the coupling lever relative to the pawl within a predetermined angle of rotation is possible. For this purpose, for example, a driver cam on the coupling lever can engage in a cam path on the pawl, or vice versa. In this way, just one actuating mechanism or Bowden cable is sufficient for the pivoting of the coupling lever and the pawl.

In a further embodiment, the steering wheel can have a steering wheel rim which, when the steering wheel is straightened in the driving position, lies at least substantially in a plane which is oriented at right angles to a steering column or steering axle, the following being provided as a further position:
 a first comfort position, in which the steering wheel rim is in a plane which is oriented at least substantially horizontally with respect to a roadway plane, and
 a second comfort position lying between the driving position and the first comfort position, in which the steering wheel rim is slightly inclined toward a driver from the horizontal, but less so than in the driving position.

In one possible embodiment, a spring constant of the spring and an angle of the chamfer of the stop surface of the coupling lever and/or of the at least one stop surface corresponding thereto are dimensioned such that a force on a steering wheel rim of the steering wheel, at its six o'clock position, in particular a force which a driver or user is capable of applying to the steering wheel rim in an exceptional situation or emergency situation, for example a force of approximately 150 N to 400 N, in particular 200 N, leads to displacement of the coupling lever out of the further position in the direction of the driving position, counter to the force of the spring, out of the working plane and thus out of engagement with the rotary latch element.

In one possible embodiment, a stop is arranged between the working plane and the second working plane, which stop prevents the pawl from leaving the further working plane in the direction of the working plane, and prevents the coupling lever from being shifted out of the working plane in the direction of the further working plane.

In one possible embodiment, a sensor is provided, which is configured to detect whether the steering wheel is secured in the driving position. The sensor can be designed as a microswitch. A cam surface can be provided on the pawl, which actuates the microswitch only when the pawl is engaged with the further rotary latch element.

In a development, a bearing, in particular a metal-reinforced self-lubricating plain bearing having a PTFE layer, is arranged on the first shaft and/or on the second shaft.

In a development, instead of or in addition to the mechanical overload release, an alternative additional release from the at least one further position is provided by means of an opening aid accessible to a user, in particular a lever, a handle and/or a cord, or another suitable means. In this case, it may be possible that the pawls are controlled by the Bowden cable and the additional actuation at the pawls must take place reciprocally.

DESCRIPTION OF THE FIGURES

Embodiments of the invention are explained in greater detail with reference to the drawings, in which.

DETAILED DESCRIPTION

Parts corresponding to one another are provided with the same reference signs in all the drawings.

Figure 1:
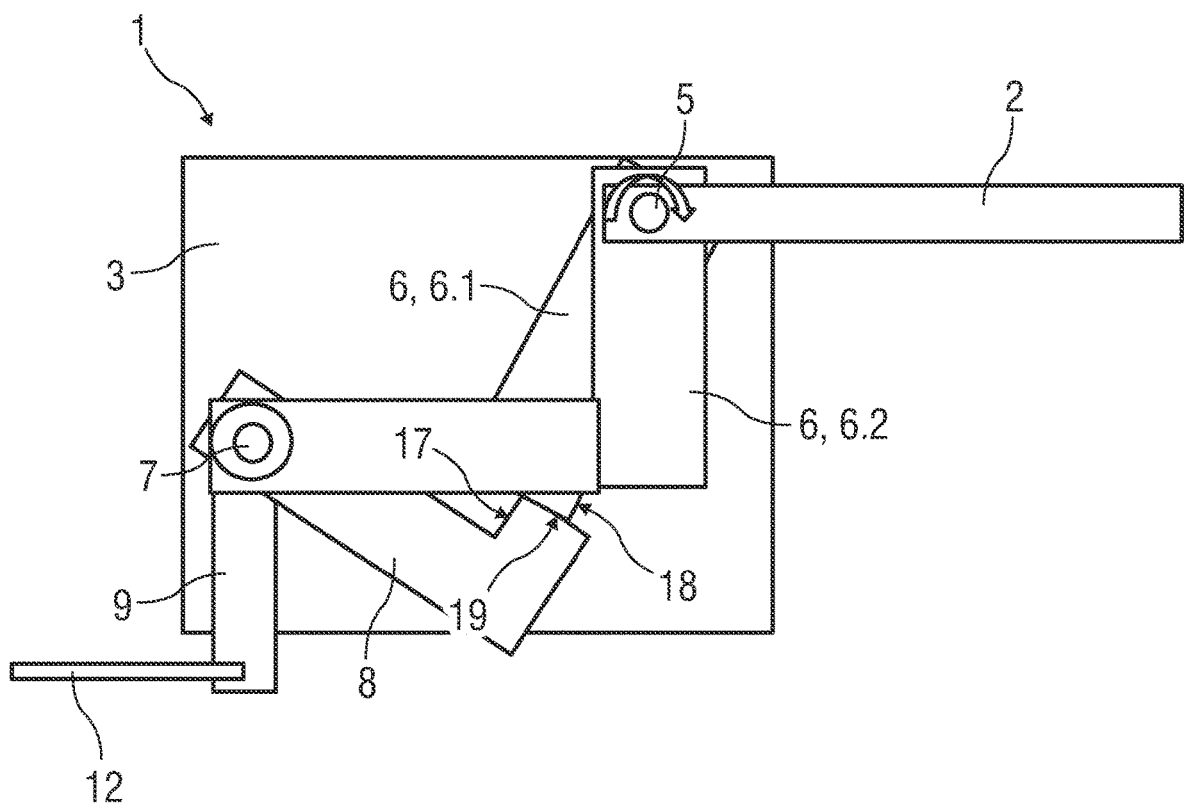
FIG. 1 is a schematic view of an adjustment device for a steering wheel of a motor vehicle.
Figure 2:
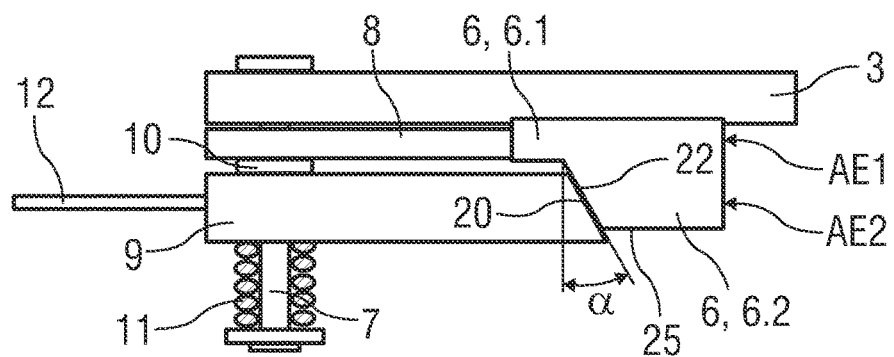
FIG. 2 is a further schematic view of the adjustment device.
Figure 3:
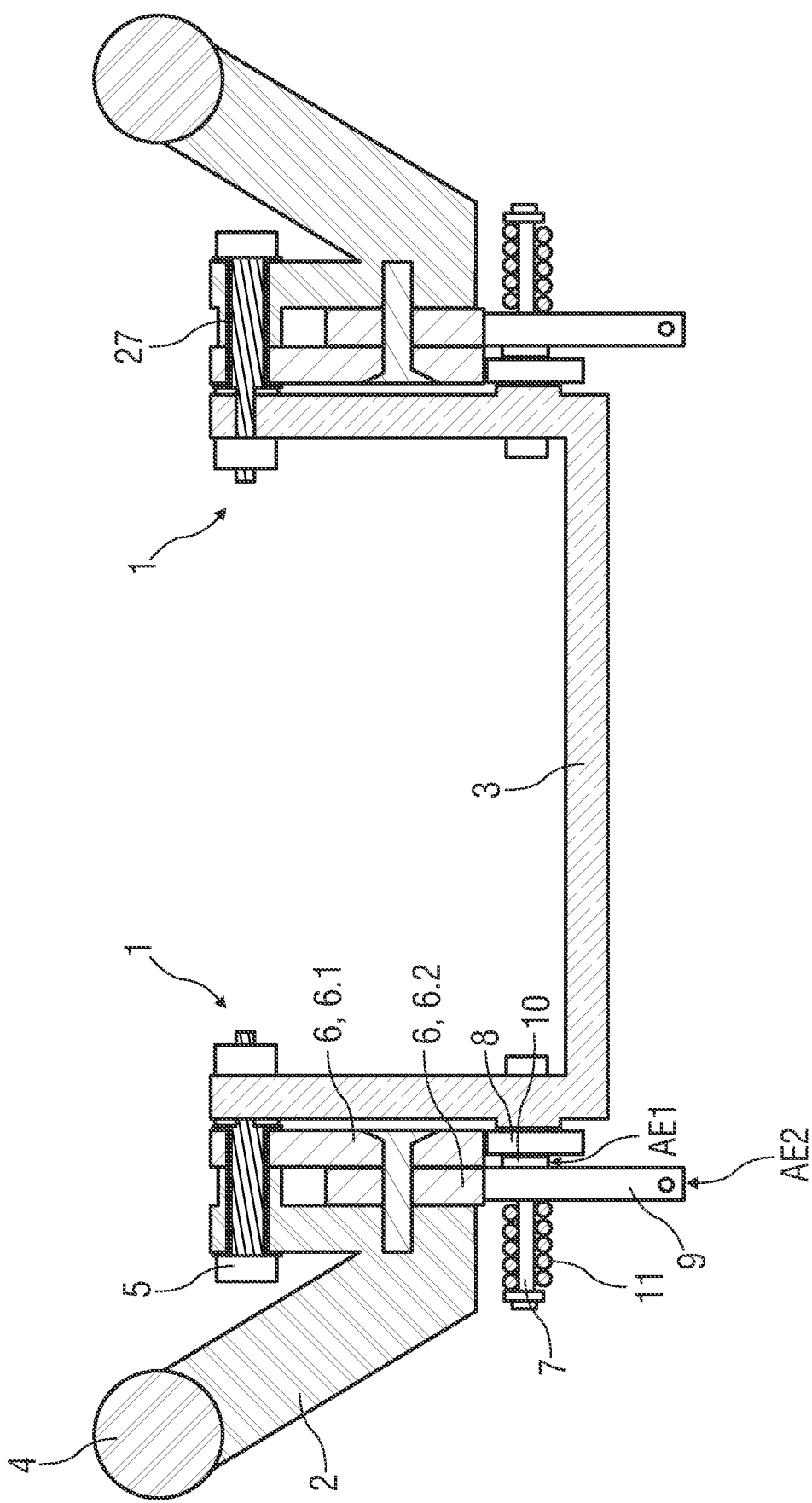
FIG. 3 is a schematic view of a steering wheel comprising two adjustment devices according to FIGS. 1 and 2.
Figure 4:
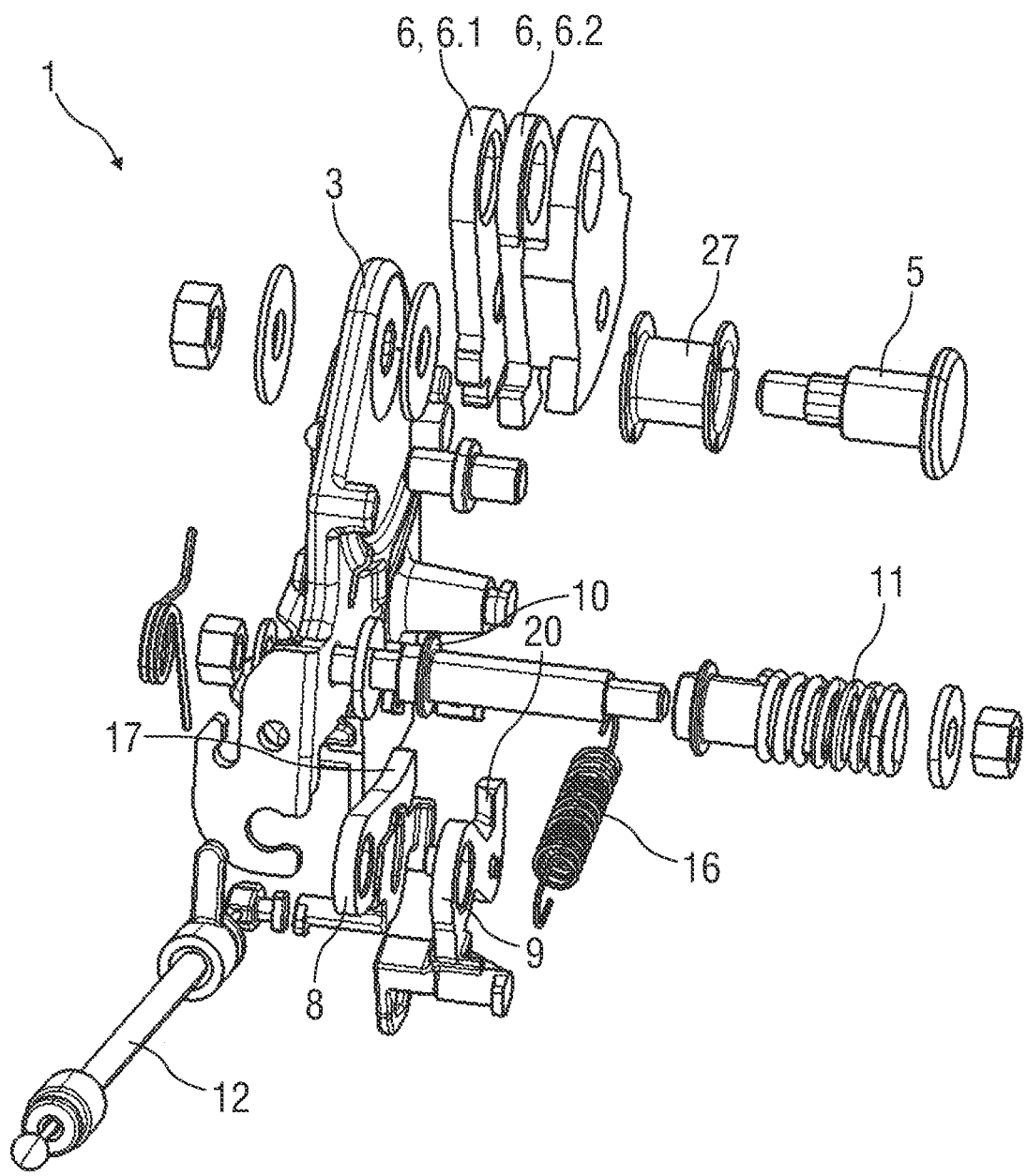
FIG. 4 is a schematic exploded view of the adjustment device.

FIG. 1 is a schematic view of an adjustment device 1 for a steering wheel 2 of a motor vehicle. FIG. 2 is a further schematic view of the adjustment device 1. FIG. 3 is a schematic view of the steering wheel 2 comprising two adjustment devices 1 according to FIGS. 1 and 2, which are arranged on opposite sides of the steering wheel 2. FIG. 4 is a schematic exploded view of the adjustment device 1.

The adjustment device 1 has a fitting 3 or a bearing block 3 which can be connected to a steering column (not shown). The steering wheel 2 is pivotable relative to the bearing block 3 about a first shaft 5 which is arranged in the bearing block 3 and can be oriented, for example, transversely to the steering column, in particular pivotable such that the straightened steering wheel 2 is adjustable between
- a driving position FP, in which a steering wheel rim 4 of the steering wheel 2 lies at least substantially in a plane which is oriented at right angles to the steering column,
- a first comfort position KP1, in which the steering wheel rim 4 lies in a plane which is oriented at least substantially horizontally to the roadway plane, and
- a second comfort position KP2 lying between the driving position FP and the first comfort position KP1, in which the steering wheel rim 4 is slightly inclined toward a driver from the horizontal, but less than in the driving position FP.

Figure 5:
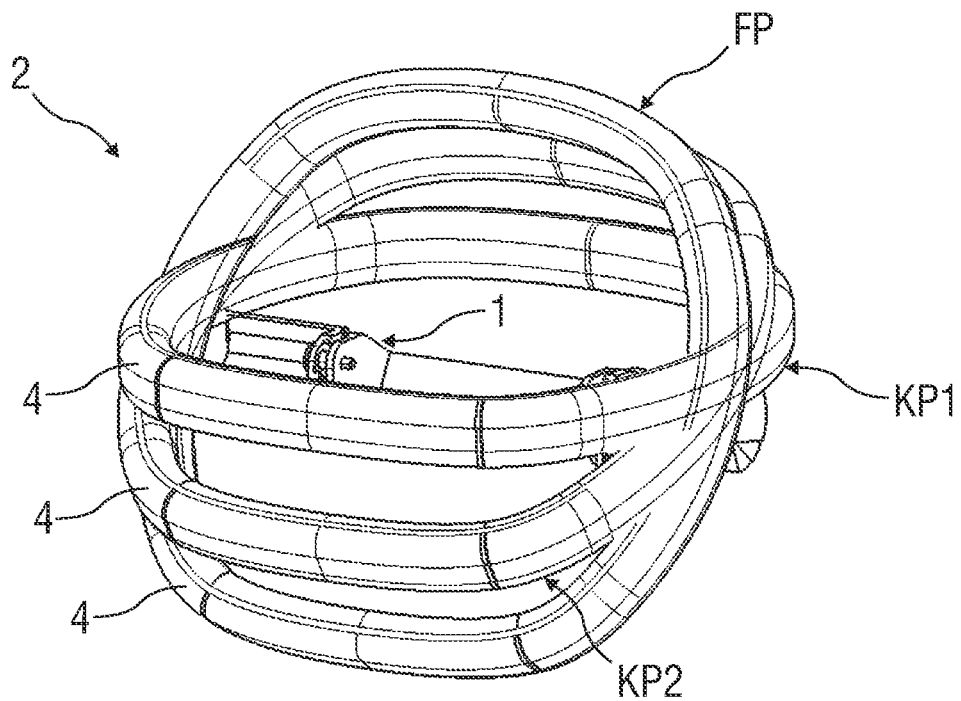
FIG. 5 is a schematic view of the steering wheel in a driving position, a first comfort position and a second comfort position.
Figure 6:
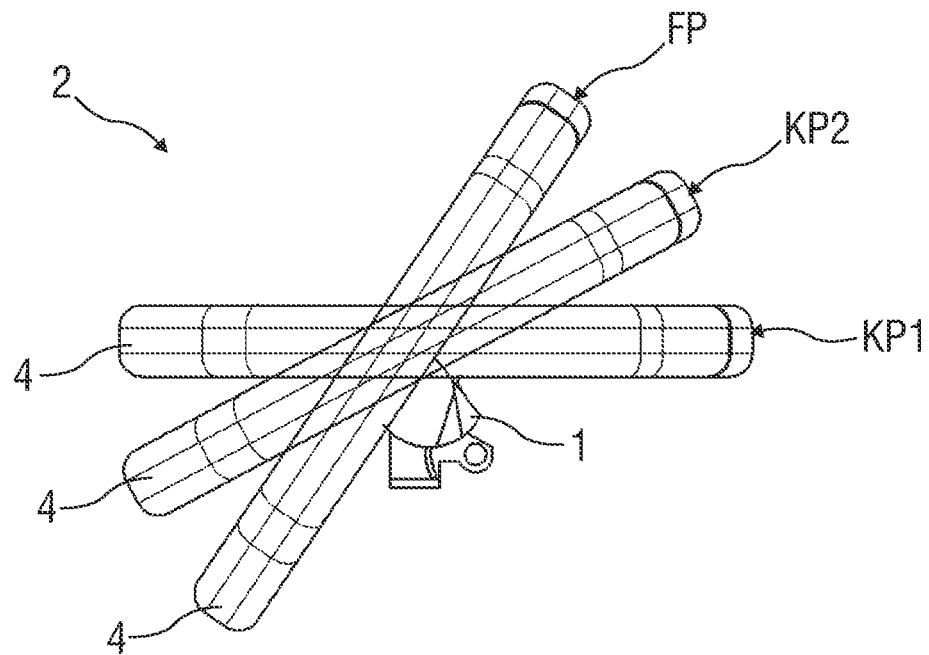
FIG. 6 is a further schematic view of the steering wheel in a driving position, a first comfort position and a second comfort position.
Figure 7:
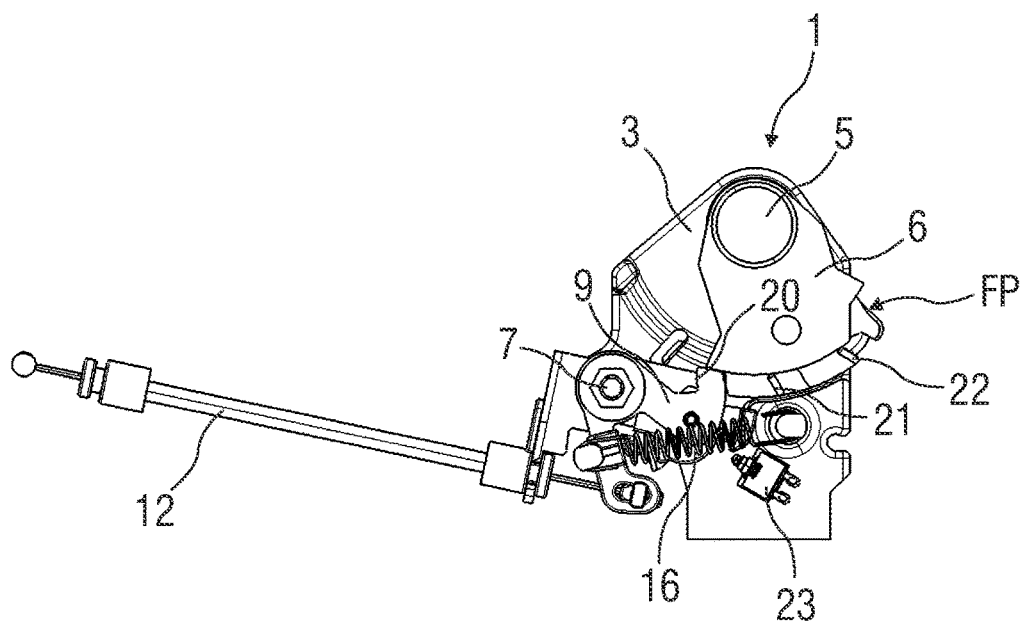
FIG. 7 is a schematic view of the adjustment device in the driving position.
Figure 8:
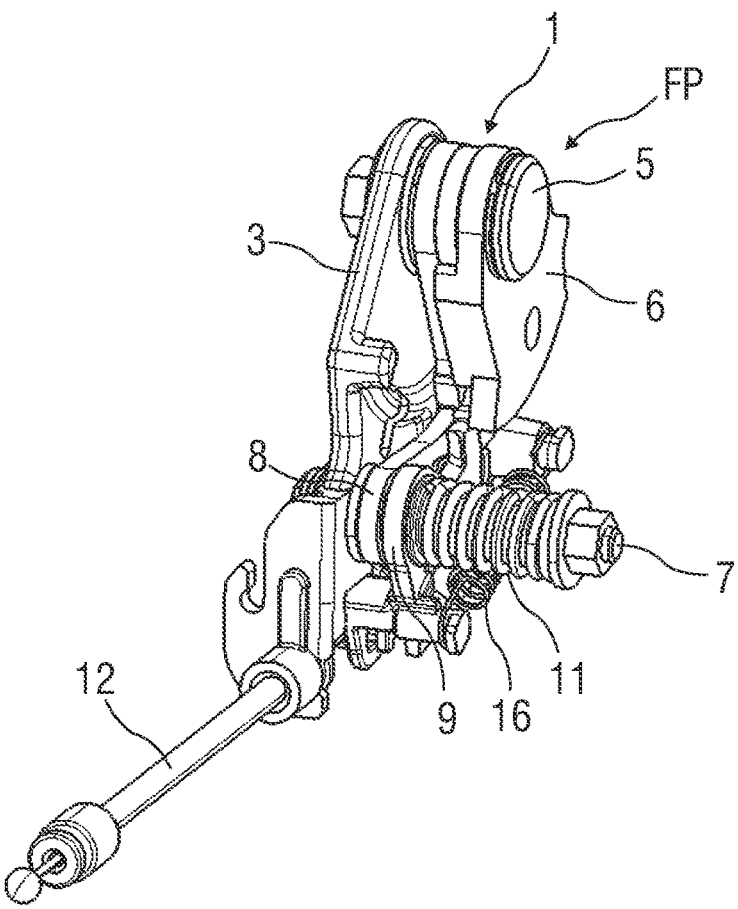
FIG. 8 is a further schematic view of the adjustment device in the driving position.

FIGS. 5 and 6 are schematic views of the steering wheel 2 in the described positions. FIGS. 7 and 8 are further schematic views of the adjustment device 1 in the driving position FP.

Figure 9:
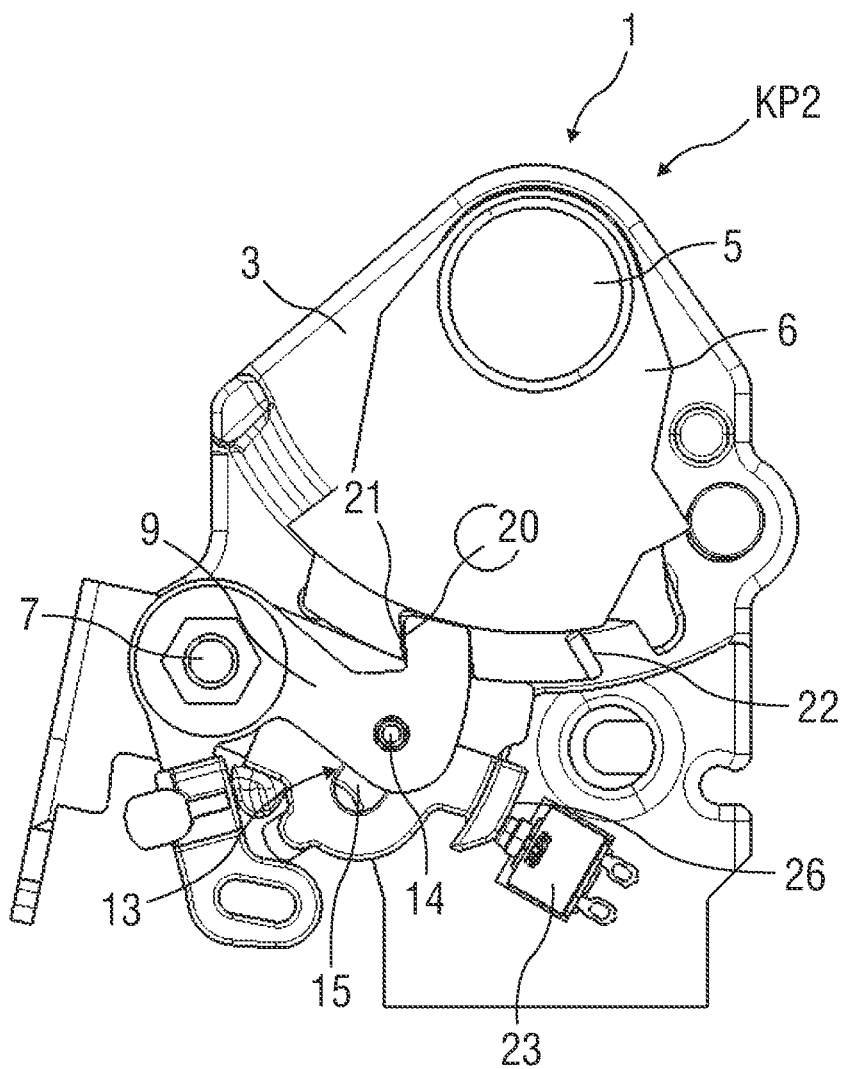
FIG. 9 is a schematic view of the adjustment device in the second comfort position.
Figure 10:
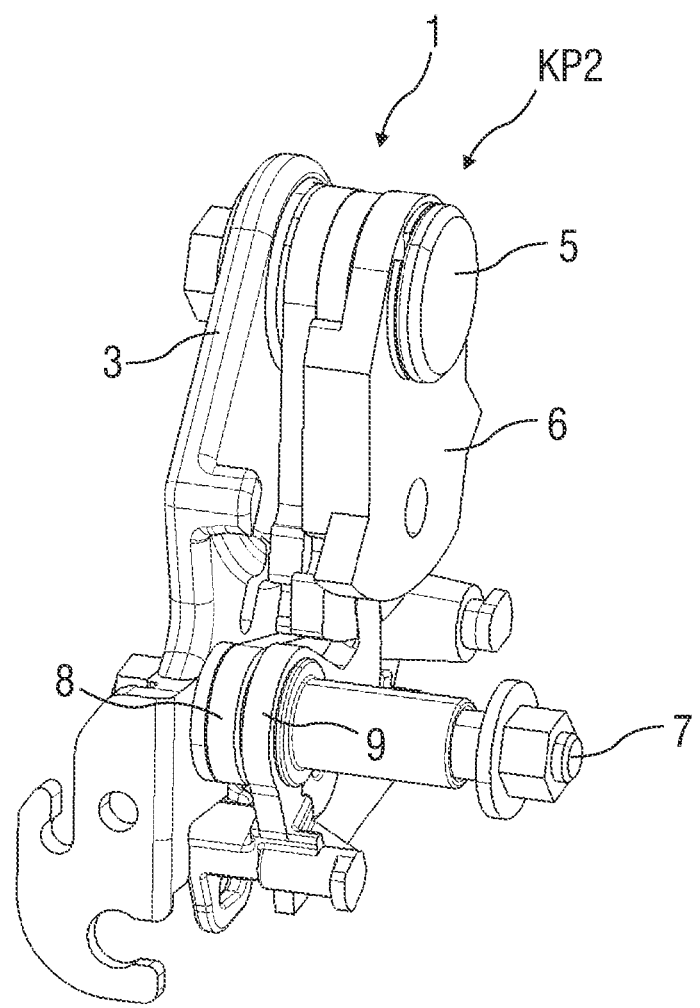
FIG. 10 is a further schematic view of the adjustment device in the second comfort position.
Figure 11:
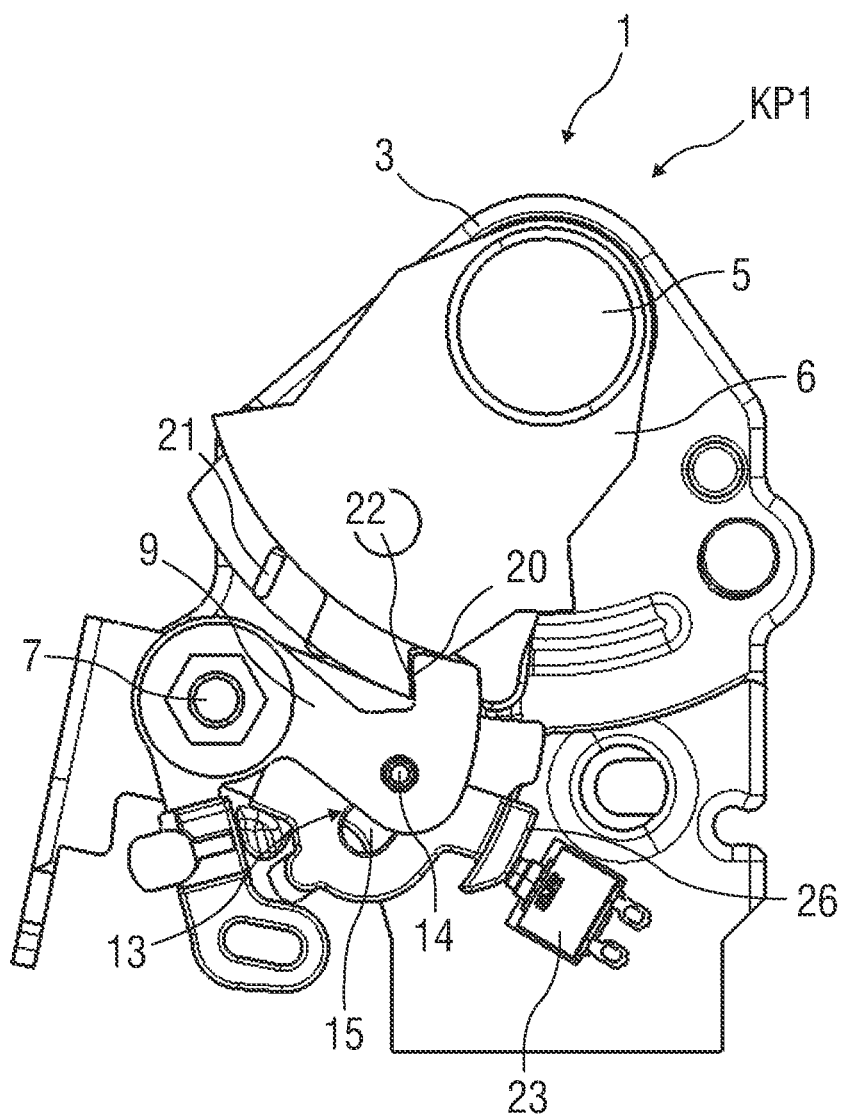
FIG. 11 is a schematic view of the adjustment device in the first comfort position.
Figure 12:
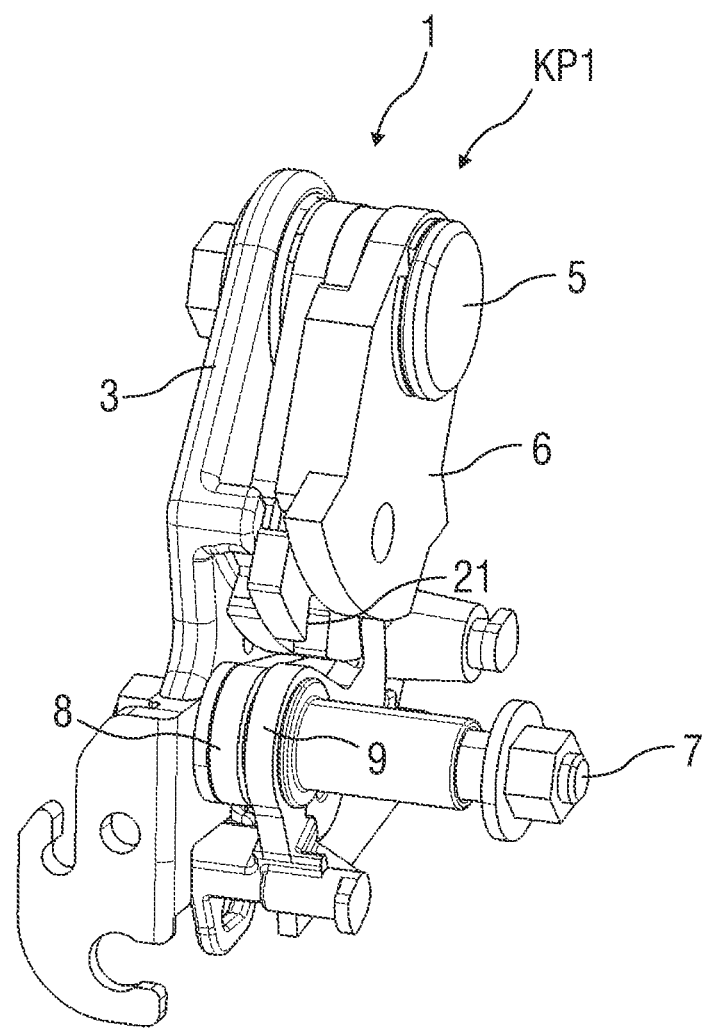
FIG. 12 is a further schematic view of the adjustment device in the first comfort position.

FIGS. 9 and 10 are further schematic views of the adjustment device 1 in the second comfort position KP2. FIGS. 11 and 12 are further schematic views of the adjustment device 1 in the first comfort position KP1.

A rotary latch 6 comprising a first rotary latch element 6.1 arranged in a first working plane AE1 and a second rotary latch element 6.2 arranged in a second working plane AE2 is rotationally fixed to the steering wheel 2 and can be pivoted together therewith about the first shaft 5. For this purpose, a bearing 27, in particular a plain bearing, for example a metal-reinforced, self-lubricating plain bearing comprising a polytetrafluoroethylene (PFTE) layer, can be arranged on the first shaft 5. The first rotary latch element 6.1 and the second rotary latch element 6.2 may be formed separately or as a common part.

A second shaft 7 is arranged in the bearing block 3 in parallel with the first shaft 5. A pawl 8 is pivotably arranged on the second shaft 7, in the first working plane AE1 of the rotary latch 6, such that it can interact with the first rotary latch element 6.1. Furthermore, a coupling lever 9 is pivotably arranged on the second shaft 7, in the second working plane AE2, such that it can interact with the second rotary latch element 6.2 of the rotary latch 6.

Between the first working plane AE1 and the second working plane AE2, a stop 10 can be provided on the second shaft 7, which stop prevents the pawl 8 from leaving the first working plane AE1, and prevents the coupling lever 9 from being moved out of the second working plane AE2 in the direction of the first working plane AE1.

However, the coupling lever 9 is displaceably arranged on the second shaft 7 such that it can be moved out of the second working plane AE2, away from the pawl 8. A spring 11, for example a coil spring, is arranged, for example on the second shaft 7, such that it preloads the coupling lever 9 toward the second working plane AE2, such that it can be displaced out of the second working plane AE2 only in opposition to the force of the spring 11. A bearing, in particular a plain bearing, for example a metal-reinforced, self-lubricating plain bearing comprising a PTFE layer, can also be arranged on the second shaft 7, in particular in order to enable or facilitate the axial displacement of the coupling lever 9.

An actuating mechanism 12, for example a Bowden cable 12, is connected to the coupling lever 9 in order to pivot said lever about the second shaft 7, out of possible engagement with the second rotary latch element 6.2. The actuating mechanism 12 can be configured for manual actuation and/or for operation by an electric drive.

The pawl 8 and the coupling lever 9 can be pivoted about the second shaft 7 independently of one another, at least within a predetermined angle of rotation. However, a driver mechanism 13 can be provided which, when the coupling lever 9 is pivoted about a predetermined angle of rotation, also entrains the pawl 8 and pivots it out of possible engagement with the first rotary latch element 6.1.

Figure 18:
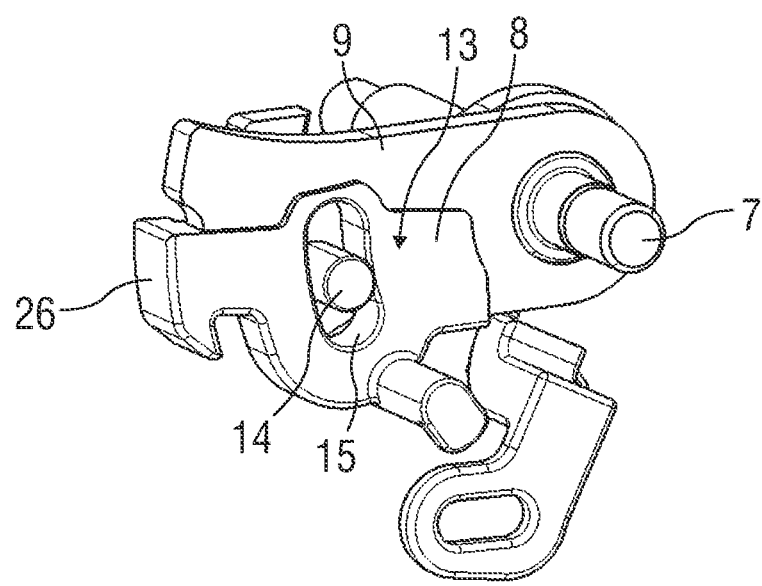
FIG. 18 is a schematic view of a driver mechanism.

FIG. 18 is a schematic view of the driver mechanism 13. The driver mechanism 13 can comprise, for example, a driver cam 14 on the coupling lever 9 and a cam track 15 in the pawl 8, in which the driver cam 14 engages. Alternatively, the driver cam 14 can be arranged on the pawl 8 and the cam track 15 in the coupling lever 9.

A restoring spring 16 can be provided, which preloads the coupling lever 9 toward an engagement with the second rotary latch element 6.2. Due to the driver mechanism 13, the pawl 8 is thus also preloaded toward an engagement with the first rotary latch element 6.1.

Figure 17:
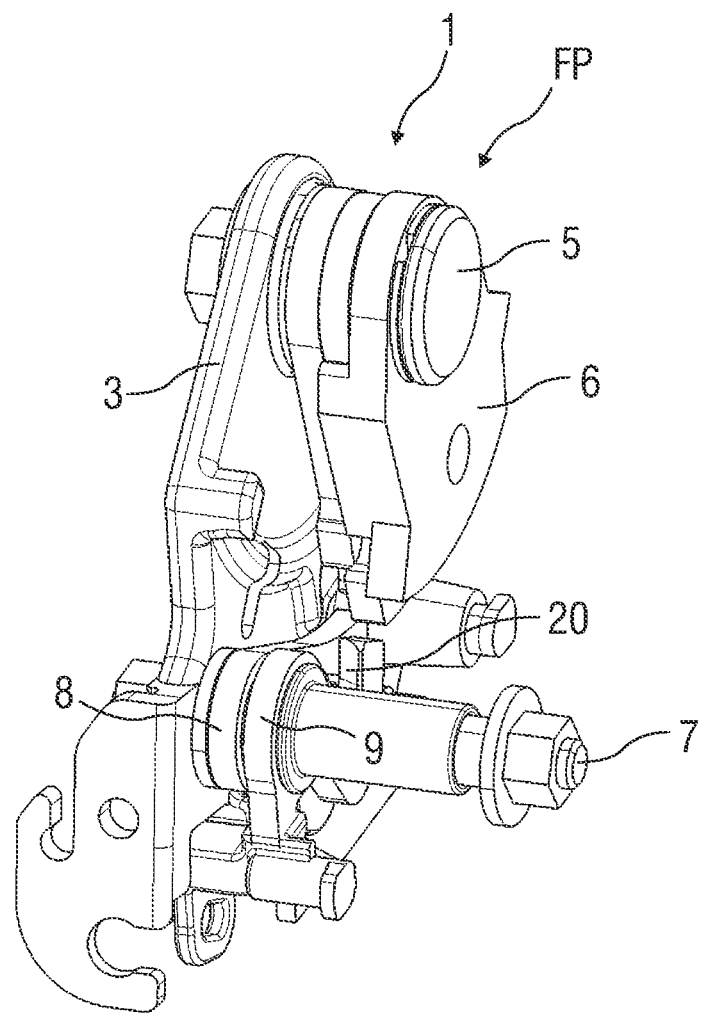
FIG. 17 is a schematic view of the adjustment device in the driving position, a Bowden cable being pulled.

The pawl 8 has a first stop surface 17 which, by means of the force of the restoring spring 16, engages in a corresponding second stop surface 18 of the first rotary latch element 6.1 and strikes thereon when the steering wheel 2, and thus also the rotary latch 6, are pivoted into the driving position FP and the actuating mechanism 12 is not actuated. A pivoting of the steering wheel 2 out of the driving position FP in the direction of the second comfort position KP2 or the first comfort position KP1 is possible only if the actuating mechanism 12 is previously actuated, for example the Bowden cable 12 is pulled, in order to pivot the pawl 8 out of engagement with the first rotary latch element 6.1. FIG. 17 is a schematic view of the adjustment device 1 in the driving position FP, the Bowden cable 12 being pulled. When the steering wheel 2 is located in the second comfort position KP2 or the first comfort position KP1, the pawl 8 rests on a peripheral surface 19 of the first rotary latch element 6.1, as a result of the force of the restoring spring 16, and does not impede the pivoting of said rotary latch element.

Figure 13:
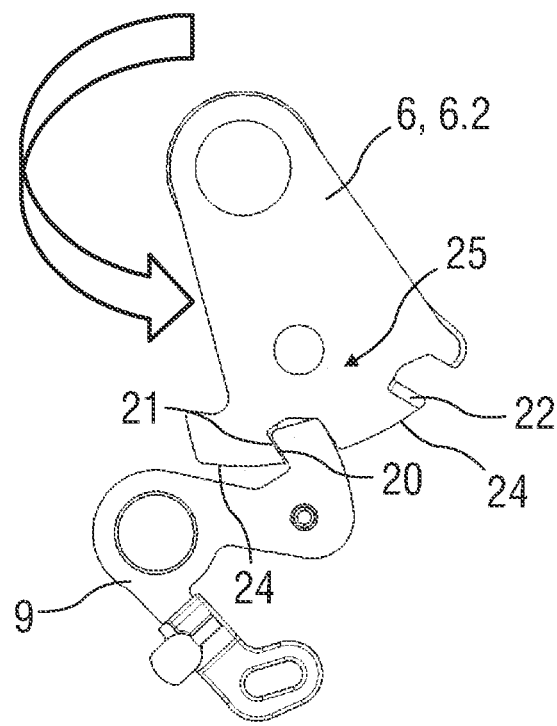
FIG. 13 is a schematic view of a rotary latch with a coupling lever.
Figure 14:
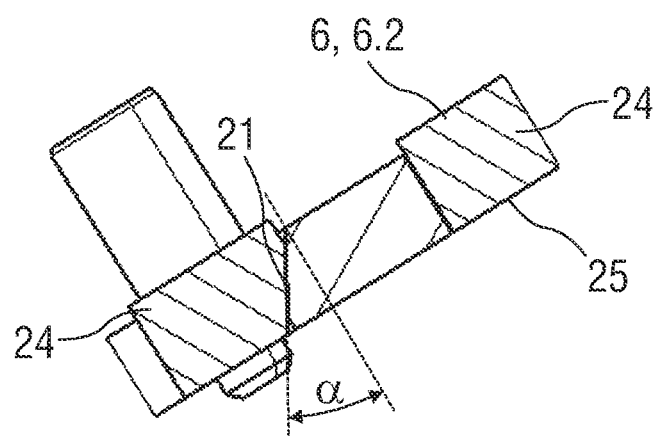
FIG. 14 is a schematic view of the rotary latch.

FIGS. 13 and 14 are schematic views of the rotary latch 6 comprising the coupling lever 9. The coupling lever 9 has a third stop surface 20 which, by means of the force of the restoring spring 16, engages in a corresponding fourth stop surface 21 of the second rotary latch element 6.2 and strikes thereon when the steering wheel 2, and thus also the rotary latch 6, is pivoted into the second comfort position KP2 and the actuating mechanism 12 is not actuated, or engages in a corresponding fifth stop surface 22 of the second rotary latch element 6.2 and strikes thereon when the steering wheel 2, and thus also the rotary latch 6, is pivoted into the first comfort position KP1 and the actuating mechanism 12 is not actuated.

The third stop surface 20 and/or the fourth and fifth stop surfaces 21, 22 have/has a chamfer via which the coupling lever 9 is displaced from the first comfort position KP1 or the second comfort position KP2 in the direction of the driving position FP, in opposition to the force of the spring 11, out of the second working plane AE2 and thus out of the engagement with the second rotary latch element 6.2, when a sufficiently large force is applied to the steering wheel 2, in particular to the steering wheel rim 4 in a six o'clock position.

Figure 15:
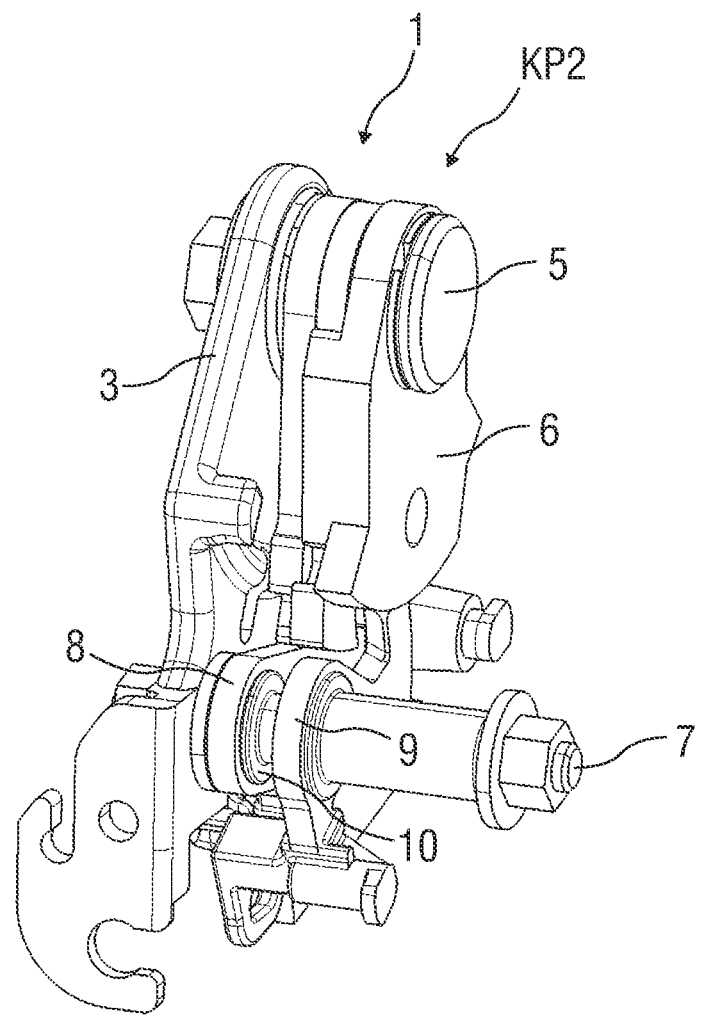
FIG. 15 is a schematic view of the adjustment device in the second comfort position, the coupling lever being displaced out of engagement with the rotary latch.
Figure 16:
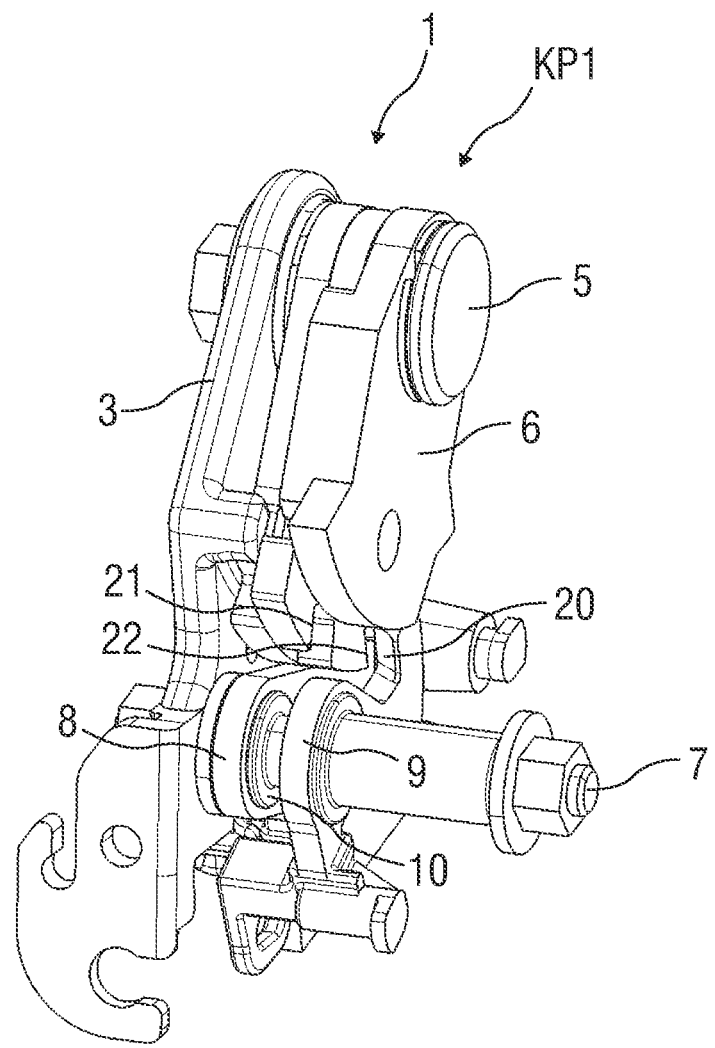
FIG. 16 is a schematic view of the adjustment device in the first comfort position, the coupling lever being displaced out of engagement with the rotary latch.

FIG. 15 is a schematic view of the adjustment device 1 in the second comfort position KP2, the coupling lever 9 being displaced out of the second working plane AE2 and thus out of the engagement with the second rotary latch element 6.2. FIG. 16 is a schematic view of the adjustment device 1 in the first comfort position KP1, the coupling lever 9 being displaced out of the second working plane AE2 and thus out of the engagement with the second rotary latch element 6.2.

A pivoting of the steering wheel 2 out of the second comfort position KP2 or the first comfort position KP1 in the direction of the driving position FP is therefore possible on the one hand by applying a sufficiently large force to the steering wheel rim 4, but on the other hand also when the actuating mechanism 12 is previously actuated, for example the Bowden cable 12 is pulled, in order to pivot the coupling lever 9 out of engagement with the second rotary latch element 6.2.

If the steering wheel 2 is not located in the second comfort position KP2 or the first comfort position KP1, as a result of actuation of the actuating mechanism 12, the coupling lever 9 then does not rest on a peripheral surface 24 of the second rotary latch element 6.2 when the actuation of the actuating mechanism 12 is continued, or without continuing actuation of the actuating mechanism 12, due to the force of the restoring spring 16, and does not impede the pivoting thereof. When the steering wheel 2 has been displaced out of the second comfort position KP2 or the first comfort position KP1 due to the application of a force on the steering wheel 2, the coupling lever 9 then rests on a lateral surface 25 of the second rotary latch element 6.2 without actuation of the actuating mechanism 12, due to the force of the spring 11, and does not impede the pivoting of said rotary latch element. When the second comfort position KP2 is reached, starting from the first comfort position KP1, the third stop surface 20 of the coupling lever 9 moves into the fourth stop surface 21 of the second rotary latch element 6.2 without actuation of the actuating mechanism 12, as a result of the force of the spring 11.

In one embodiment, the spring constant of the spring 11 and an angle $\alpha$ of the chamfer of the third stop surface 20 and/or of the fourth and fifth stop surfaces 21, 22 can be dimensioned such that a force of about 150 N to 250 N, in particular 200 N, on the steering wheel 2, in particular the steering wheel rim 4, at the six o'clock position thereof, is sufficient for displacing the coupling lever 9 from the first comfort position KP1 or the second comfort position KP2 in the direction of the driving position FP, in opposition to the force of the spring 11, out of the second working plane AE2 and thus out of engagement with the second rotary latch element 6.2. For this purpose, the lever lengths of the steering wheel 2, the rotary latch 6, and the friction factor of the third stop surface 20 and/or of the fourth and fifth stop surfaces 21, 22 are optionally to be taken into account accordingly. For example, the angle α of the chamfer can be approximately 30°.

Furthermore, a sensor 23, for example a microswitch 23, can be provided on the bearing block 3, which sensor is configured to detect whether the steering wheel 2 is secured in the driving position FP. For this purpose, a cam surface 26 can be provided on the pawl 8, which actuates the sensor 23 or microswitch 23 only when the pawl 8 is engaged with the first rotary latch element 6.1. This is only the case when the steering wheel 2 is in the driving position FP and the actuating mechanism 12 is not actuated. By means of the sensor 23, a controller of the vehicle can prevent the initiation of driving operation if the steering wheel 2 is not secured in the driving position FP.

LIST OF REFERENCE SIGNS 1 adjustment device
2 steering wheel
3 fitting, bearing block
4 steering wheel rim
5 first shaft
6 rotary latch
6.1 further rotary latch element, first rotary latch element
6.2 rotary latch element, second rotary latch element
7 second shaft
8 pawl
9 coupling lever
10 stop
11 spring
12 actuating mechanism, Bowden cable
13 driver mechanism
14 driver cam
15 cam track
16 return spring
17 stop surface, first stop surface
18 corresponding stop surface, second stop surface
19 peripheral surface
20 stop surface, third stop surface
21 corresponding stop surface, fourth stop surface
22 corresponding stop surface, fifth stop surface
23 sensor, microswitch
24 peripheral surface
25 lateral surface
26 cam surface
27 bearing
AE1 further working plane, first working plane
AE2 working plane, second working plane
FP driving position
KP1 first comfort position, further position
KP2 second comfort position, further position
α angle

The invention claimed is:

1. An adjustment device for a steering wheel of a motor vehicle, comprising at least one bearing block having a first shaft about which the steering wheel is pivotable between a driving position and at least one further position,
   wherein a rotary latch is rotationally fixed to the steering wheel by a rotary latch element that is pivotable together therewith about the first shaft,
   wherein a second shaft is arranged in the bearing block in parallel with the first shaft,
   wherein a coupling lever is arranged on the second shaft to interact with the rotary latch element,
   wherein the coupling lever is arranged on the second shaft so as to be displaceable in opposition to the force of a spring,
   wherein the coupling lever has a stop surface, which, for the purpose of engagement, engages in at least one corresponding stop surface of the rotary latch element and strikes thereon when the steering wheel, and thus also the rotary latch, is pivoted into the at least one further position,
   wherein the stop surface of the coupling lever and the at least one corresponding stop surface of the rotary latch element comprise a chamfer, via which the coupling lever can be displaced or is displaced out of the engagement with the rotary latch element and out of the at least one further position in a direction of the driving position, in opposition to the force of the spring, when a predetermined force is applied to the steering wheel.

2. The adjustment device according to claim 1, wherein the rotary latch has a further rotary latch element, wherein a pawl is arranged pivotably on the second shaft to interact with the further rotary latch element, wherein the pawl has a stop surface which, due to the force of a restoring spring, engages in a corresponding stop surface of the further rotary latch element and strikes thereon when the steering wheel, and thus also the rotary latch, is pivoted into the driving position.

3. The adjustment device according to claim 2, wherein an actuating mechanism is arranged so as to pivot the coupling lever or the pawl about the second shaft, out of engagement with the rotary latch.

4. The adjustment device according to claim 2, wherein a driver mechanism is arranged which, when the coupling lever is pivoted by a predetermined angle of rotation, also entrains the pawl and pivots the pawl out of a possible engagement with the further rotary latch element.

5. The adjustment device according to claim 1, wherein a stop is arranged to prevent the pawl from travelling beyond the stop surface, and to prevent the coupling lever from being displaced.

6. The adjustment device according to claim 2, wherein a sensor is provided which is configured to detect whether the steering wheel is secured in the driving position, wherein the sensor is a microswitch, and wherein a cam surface is provided on the pawl which actuates the microswitch only when the pawl is engaged with the further rotary latch element.

7. The adjustment device according to claim 1, wherein the coupling lever is preloaded by the spring.

8. The adjustment device according to claim 1, wherein a spring constant of the spring and an angle of the chamfer of the stop surface of the coupling lever and/or of the at least one corresponding stop surface are dimensioned such that a force on a steering wheel rim of the steering wheel at a six o'clock position thereof leads to displacement of the coupling lever out of the further position in the direction of the driving position, in opposition to the force of the spring, and thus out of the engagement with the rotary latch element.

9. The adjustment device according to claim 1, wherein a bearing is arranged on the first shaft or on the second shaft.

10. The adjustment device according to claim 9, wherein the bearing is formed as a metal-reinforced, self-lubricating plain bearing having a polytetrafluoroethylene (PTFE) layer.

* * * * *